UNITED STATES PATENT OFFICE.

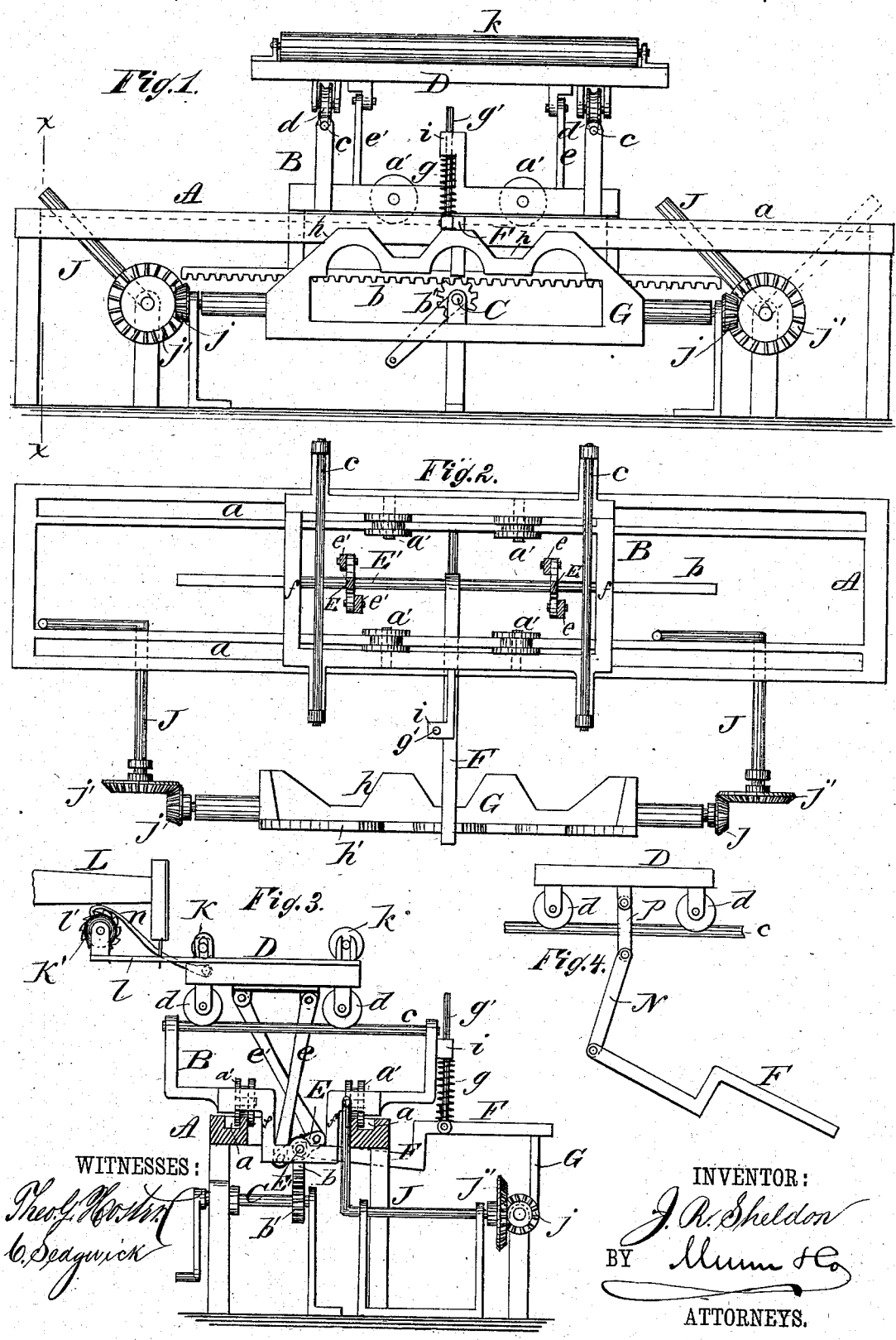

JOHN R. SHELDON, OF MONTVILLE, CONNECTICUT.

QUILTING-MACHINE.

SPECIFICATION forming part of Letters Patent No. 255,037, dated March 14, 1882.

Application filed July 28, 1881. (No model.)

*To all whom it may concern:*

Be it known that I, JOHN R. SHELDON, of Montville, in the county of New London and State of Connecticut, have invented a new and useful Improvement in Quilting-Machines, of which the following is a full, clear, and exact specification.

My invention relates to that class of quilting-machines which carry the quilt under the needle-arm of the sewing-machine, and at the same time give it a transverse motion for stitching the pattern; and it has for it object the production of a machine of this character which will form a more perfect pattern and will stitch the last seam in the quilt in a more perfect manner than those heretofore produced, and a machine of simplified and improved construction.

The invention consists of the traveling quilt-carriage, moved transversely by novel lever-connections running in contact with the pattern or form.

The invention further consists of an automatically-reversible pattern, and also of the details of construction and the arrangement and combination of parts, as hereinafter more fully described.

In the accompanying drawings, Figure 1 is a side elevation of my improved quilting-machine. Fig. 2 is a plan view with the quilt-carriage removed. Fig. 3 is a cross-sectional elevation on line $x\,x$ of Fig. 1, and Fig. 4 illustrates a modification of the lever mechanism.

Similar letters of reference indicate corresponding parts.

A represents the main frame of the machine, which is formed with the ways $a\,a$, upon which the carriage B travels, supported upon the wheels $a'$, the carriage being moved by means of the rack $b$ meshing with the pinion $b'$ upon the crank-shaft C.

The carriage B is formed with the transverse tracks $c\,c$, upon which the quilt-carriage D moves upon the wheels $d\,d$. This carriage is firmly held upon the tracks $c\,c$ by the hinged levers $e\,e$ and $e'\,e'$, which cross each other in pairs and connect with the levers E E, fixed upon the shaft $E'$, which shaft is journaled in the bent cross-pieces $f\,f$ of the carriage B. This shaft $E'$ has rigidly secured to it the arm F, which runs in contact with the pattern or form G, being held in close contact therewith by the coiled spring $g$, placed upon the spindle $g'$ between the sleeve $i$, which is secured upon the side piece of the carriage B and the top of the arm, as shown in the drawings. By this means, when the carriage B is moved along the frame by turning the crank-shaft C, the quilt-carriage will be given a regular and positive transverse movement, according to the shape of the pattern or form, causing the seams to be regular and to perfectly correspond with the pattern.

The pattern G is formed with double faces $h$ and $h'$, as shown, and it is provided at its ends with the beveled-gear wheels $j\,j$, which mesh with the beveled-gear wheels $j'\,j'$ secured upon the outer ends of the bent shafts J J. These shafts are bent upward at their inner ends, as shown, and are so arranged at the ends of the main frame that the pattern or form is automatically reversed by the carriage B coming against them at the ends of its movement.

The upper side of the carriage D is provided with the slotted projections in which the roller $k$, upon which the quilt to be quilted is wound, rests, and with the movable guide-roller K, under which the quilt passes, and also with the roller $K'$, which is journaled upon the arms $l\,l$, and upon which the quilt as it is completed is wound. One end of the roller $K'$ is formed with the ratchet $l'$, with which the pawl $n$ engages for holding the quilt taut as it passes under the needle-arm L of the sewing-machine.

Instead of using the double connecting-levers $e\,e$ and the fixed double levers E upon the rock-shaft $E'$, for moving the transverse quilt-carriage, the single vertical lever N, rigidly secured upon the shaft, may be used, the upper end of said lever being connected with the under side of the carriage by the link $p$, as shown in Fig. 4; but the plan shown in Fig. 3 and above described is the preferred plan.

Having thus fully described my invention, I claim as new and desire to secure by Letters Patent—

1. The carriage D, secured upon the rods $c\,c$ and moved thereon by the levers $e$ and $e'$, connected with the levers E, secured upon the shaft $E'$, the shaft being rocked by the arm F, running in contact with the pattern or form G, substantially as and for the purposes set forth.

2. The carriage D and the shaft $E'$, connected together by levers, substantially as described, in combination with the arm F, held upon the form or pattern by the spring g, as and for the purposes specified.

3. The form or pattern G, provided with the gears j j, in combination with the shafts J J, provided with the gears j' j', as and for the purposes specified.

4. The combination of the carriage B, the bent shafts J, the form or pattern G, and the gear-wheels j and j', substantially as and for the purposes set forth.

5. The traveling carriage B, carrying the transverse carriage D, the two carriages being secured together by, and the carriage D moved by, the levers e e', levers E, and rock-shaft E', in combination with the arm F, rigidly fixed upon the shaft and running in contact with the form or pattern G, substantially as and for the purposes set forth.

JOHN ROGERS SHELDON.

Witnesses:
ALVIN L. BURLEY,
F. L. TAYLOR.